US008832726B2

(12) United States Patent
Adimatyam et al.

(10) Patent No.: US 8,832,726 B2
(45) Date of Patent: Sep. 9, 2014

(54) VIDEO STREAMING ENTITLEMENT DETERMINED BASED ON THE LOCATION OF THE VIEWER

(75) Inventors: Venkata Adimatyam, Irving, TX (US); Michael J. Runne, Hurst, TX (US); Enrique Ruiz-Velasco, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 367 days.

(21) Appl. No.: 12/948,431

(22) Filed: Nov. 17, 2010

(65) Prior Publication Data

US 2012/0124612 A1 May 17, 2012

(51) Int. Cl.
| H04N 7/16 | (2011.01) |
| H04N 7/18 | (2006.01) |
| H04N 7/20 | (2006.01) |
| H04N 21/835 | (2011.01) |
| H04N 21/6377 | (2011.01) |
| H04N 21/6334 | (2011.01) |
| H04N 21/414 | (2011.01) |
| H04N 21/258 | (2011.01) |
| H04N 21/61 | (2011.01) |
| H04N 21/472 | (2011.01) |

(52) U.S. Cl.
CPC ....... *H04N 21/835* (2013.01); *H04N 21/63775* (2013.01); *H04N 21/63345* (2013.01); *H04N 21/6131* (2013.01); *H04N 21/472* (2013.01); *H04N 21/41407* (2013.01); *H04N 21/25841* (2013.01)
USPC ................. 725/29; 725/20; 725/80; 725/81

(58) Field of Classification Search
None
See application file for complete search history.

(56) References Cited

U.S. PATENT DOCUMENTS

| 2004/0242228 A1* | 12/2004 | Lee et al. .................. 455/432.1 |
| 2008/0249946 A1* | 10/2008 | Candelore ...................... 705/59 |
| 2010/0153730 A1* | 6/2010 | Goria ............................ 713/173 |
| 2011/0158406 A1* | 6/2011 | Marcia et al. ................ 380/200 |

OTHER PUBLICATIONS

Co-pending U.S. Appl. No. 12/948,476, filed Nov. 17, 2010, entitled "Content Entitlement Determinations for Playback of Video Streams on Portable Devices", by Sachinder Reddy et al., 41 pages.

* cited by examiner

*Primary Examiner* — Ricky Chin

(57) ABSTRACT

Users of portable devices may stream video content to the portable device based on an entitlement determination that includes determining the location of the portable device. A device may receive a request to authenticate the portable device to receive the streaming video content and determine whether the portable device is in a geographic location corresponding to a customer premise of an account associated with the portable device. The video content may be streamed when the portable device is in the geographic location corresponding to the customer premise.

16 Claims, 8 Drawing Sheets

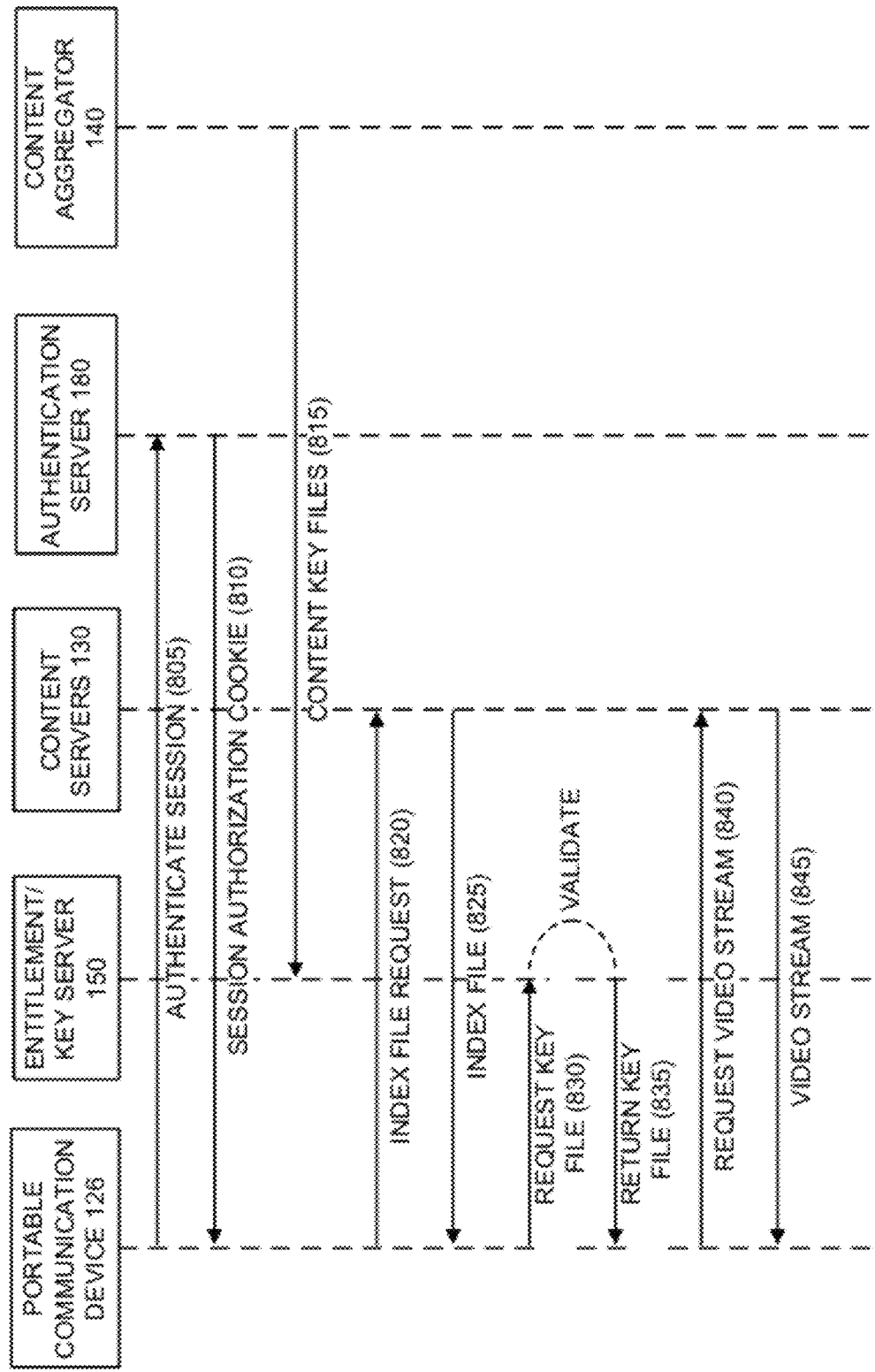

VIDEO STREAMING ENTITLEMENT DETERMINED BASED ON THE LOCATION OF THE VIEWER

BACKGROUND

Video content (e.g., television broadcasts, pay-per-view (PPV) content, video-on-demand (VOD) content, etc.) may be delivered and selected in several ways. For example, television channels may be broadcast to users. Traditionally, television broadcasts have been viewed on televisions sets. More recently, users have been offered the ability to view television broadcasts on other devices, such as desktop computers, portable computers, and portable communication devices.

Content owners may wish to place limits on how a user is allowed to view video content. For example, certain content may only be available to subscribers of a certain "premium" channel or other service. As another example, some subscribers may be given immediate access to certain content while other subscribers, such as those subscribing to a more basic level of service, may be required to wait a certain time period before being able to view the content. It is thus desirable for a content provider to be able to effectively determine and enforce whether a subscriber is entitled to view content based on a wide variety of possible entitlement factors.

BRIEF DESCRIPTION OF THE DRAWINGS

FIG. 8 is signal flow diagram illustrating an example of communications between components in a system during streaming of video content.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may determine whether a subscriber is entitled to view video content delivered over an Internet Protocol (IP) based network. The determination may be made based on the location of the subscriber.

In one example implementation, a subscriber to video content may wish to view video content on a portable device, such as a laptop, tablet computing device, or a smart phone. The portable device may connect to an IP-based content delivery system through, for example, a home router that enables a wireless local area network connection. When the portable device is connected to the home router, the user may be assumed to be "at home," and the video content may be viewed on the portable device. When, however, the portable device is connected through another access point, such as a wireless router at a neighbor's house or at a retail location, the user may be assumed to be "away from home," and the video content may be denied to the user.

Figure 1:
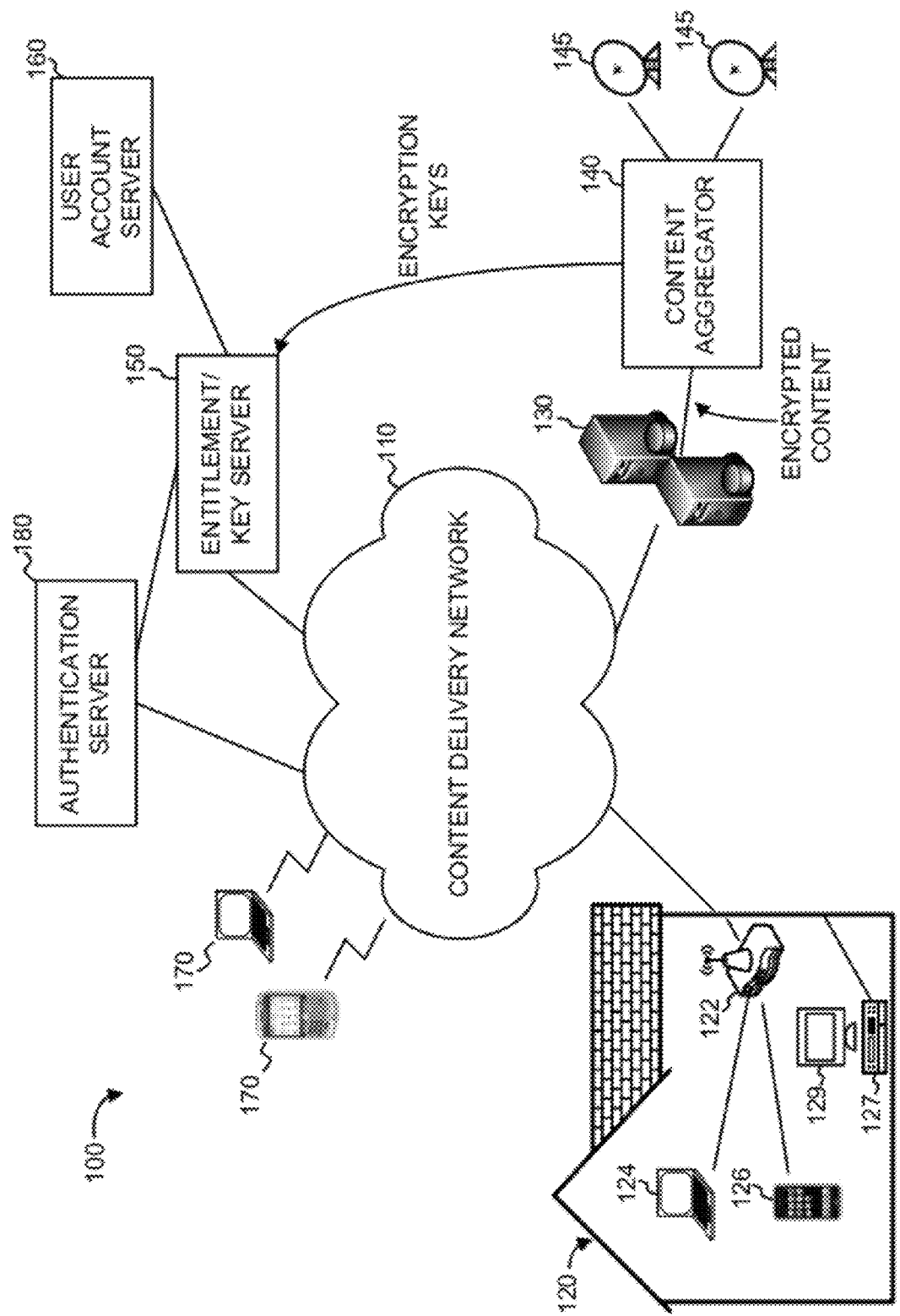
FIG. 1 is a diagram of an example environment in which systems and/or methods described herein may be implemented.

FIG. 1 is a diagram of an example environment 100 in which systems and/or methods described herein may be implemented. As illustrated, environment 100 may include a content delivery network 110, a customer premise 120, content servers 130, content aggregator 140, entitlement and/or key server 150, user account server 160, and authentication server 180. Content aggregator 140 may be coupled to one or more devices, such as satellites 145, through which content (e.g., television content) is received. Customer premise 120 may include one or more devices that can connect to content delivery network 110, such as wireless router 122, laptop computer 124, portable device 126, set-top box (STB) 127, and/or television 129. Other computing devices 170, such as laptop computers and portable communication devices, may also connect to content delivery network 110.

Content delivery network 110 may generally include a local area network (LAN), a wide area network (WAN), a metropolitan area network (MAN), a wireless network, an optical fiber (or fiber optic)-based network, a cable television network, a satellite television network, or a combination of networks. Content delivery network 110 may particularly include an IP-based network. In some implementations, content delivery network 110 may be a private network controlled by, for example, a telecommunications company that provides television, telephone, and/or data access to customer premise 120. In another implementation, content delivery network 110 may be a public network, such as the Internet, or a combination of a public and private network.

Customer premise 120 may include a residential or business entity that is connected to content delivery network 110 by a telecommunication company. Customer premise 120 may be connected to content delivery network 110 using, for example, a fiber optic connection, a coaxial connection, a satellite connection, or another type of wireless or wired connection. A gateway device may be used to connect customer premise 120 to content delivery network 110. For example, for a fiber optic connection, an optical network terminal (ONT) may convert the optical signals into an electrical format that can be used by wireless router 122. Alternatively, the functionality of the ONT may be incorporated into wireless router 122. Devices in customer premise 120 may include, for example, set-top boxes (STBs), televisions, computers, portable devices, and home networking equipment (e.g., routers, cables, splitters, local gateways, etc.). Devices within customer premise 120 may be connected via wired connections (e.g., coaxial cable, Telecommunications Industry Association category 5 ("cat 5") cable, etc.) and/or wireless connections (e.g., using network devices such as those available under the IEEE 802.11 wireless LAN standards). In the example shown in FIG. 1, customer premise 120 includes wireless router 122, which connects laptop computer 124 and portable communication device 126 to content delivery network 110. Additionally, STB 127 is shown as connecting to a television 129. STB 127 may be used to control the content shown on television 129.

Content servers 130 may include one or more server devices that store content, such as video content, that may be delivered to customer premise 120 and/or other computing devices 170. The content may include, for example, television broadcasts, video-on-demand programming, or other video content. Content servers 130 may deliver the stored content as on-demand streaming content. The television programming may be stored and made available, by content servers 130, in real-time or near real-time relative to the original broadcast of the television programming. In addition to storing video content, content servers 130 may store other information, such as index information that provides additional information relating to the content, such as links to a key file needed to decrypt the content or a description of the content.

Content aggregator 140 may aggregate content, such as television programming, from a number of sources. Content aggregator 140 may, for example, receive signals for national television channels via satellites 145. Content aggregator 140 may also receive and store local television programming. In one implementation, content aggregator may be distributed over a number of geographical regions. For example, content aggregator 140 may be present at each of a number of local markets, where the content aggregator associated with each local market may receive and store local programming for that market. In this situation, national television programming may be captured at a central facility and transmitted to each of the local content aggregators. Content aggregator 140 may additionally encrypt its received content. In one implementation, content aggregator 140 may encrypt incoming video streams, using, for example, a symmetric encryption technique such as AES. The encrypted video streams may be encrypted as discrete sections in which the encryption is changed for each section. Content aggregator 140 may transmit the encryption keys to entitlement/key server 150.

Entitlement/key server 150 may include one or more server devices that provide authentication and eligibility determinations for users that wish to view content stored at content servers 130. Entitlement/key server 150 may, for example, operate to authenticate the user and provide session encryption keys through which the user may decrypt content from content servers 130. In one implementation, user authentication may be provided with the assistance of a third party, such as a third party certificate authority, illustrated as authentication server 180.

User account server 160 may include one or more server devices that include account information for a user. The account information may include information relating to programming (e.g., television channels), packages, and/or services to which a user has subscribed. User account server 160 may include other information relating to the users, such as the equipment installed at the customer premises. For example, a telecommunications company may provide each customer premises 120 with a router, such as wireless router 122. Identification information for wireless router 122, such as a media access control (MAC) address associated with the router, or the IP address assigned to the router, may be stored by user account server 160. Entitlement/key server 150 may contact user account server 160 when performing entitlement checks and/or key delivery.

Computing devices 170 may include other computing devices, such as laptop computers and/or portable communication devices, that may connect to content delivery network 110. Portable devices from within customer premise 120, when taken outside of customer premise 120, may be referred to as computing devices 170.

Authentication server 180 may provide authentication services for users that wish to receive video streams from content servers 130. Authentication server 180 may, for example, receive and process HTTPS requests from users.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more tasks described as being performed by one or more other components of environment 100.

Figure 2:
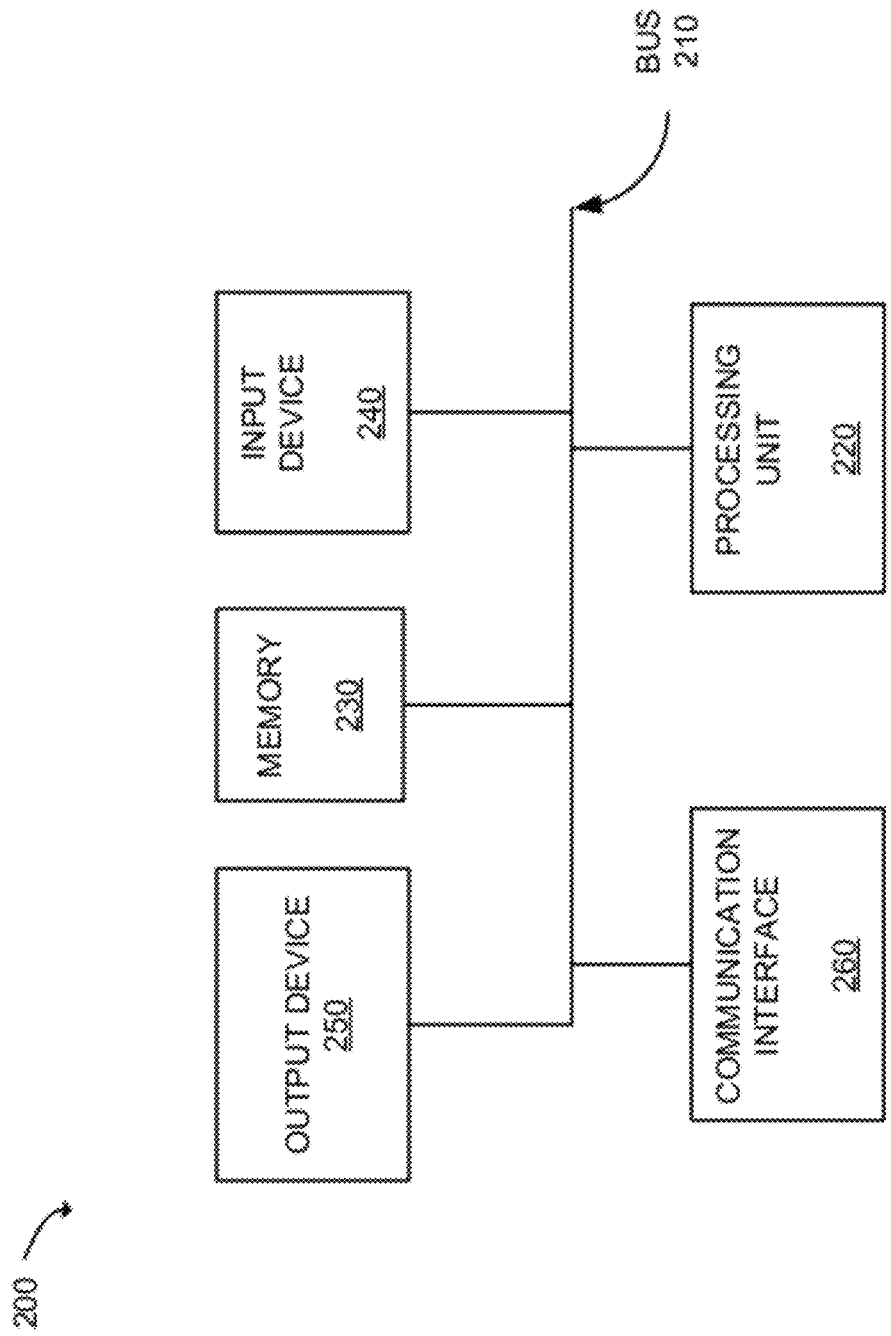
FIG. 2 is a diagram of example components of a device that may correspond to one of the devices of the environment shown in FIG. 1.

FIG. 2 is a diagram of example components of a device 200 that may correspond to one of the devices of environment 100. Device 200 may be included in, for example, content servers 130, content aggregator 140, entitlement key/server 150, user account server 160, computing devices 170, authentication server 180, wireless router 122, laptop computer 124, portable communication device 126, and/or set-top box 127. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of environment 100 and/or customer premises network 120.

As described herein, device 200 may perform certain operations in response to processing unit 220 executing software instructions contained in, for example, a non-transitory computer-readable medium, such as memory 230. A computer-readable medium may be defined as a non-transitory memory device. A memory device may include memory space within a single physical memory device or spread across multiple physical memory devices. The software instructions may be read into memory 230 from another computer-readable storage device or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
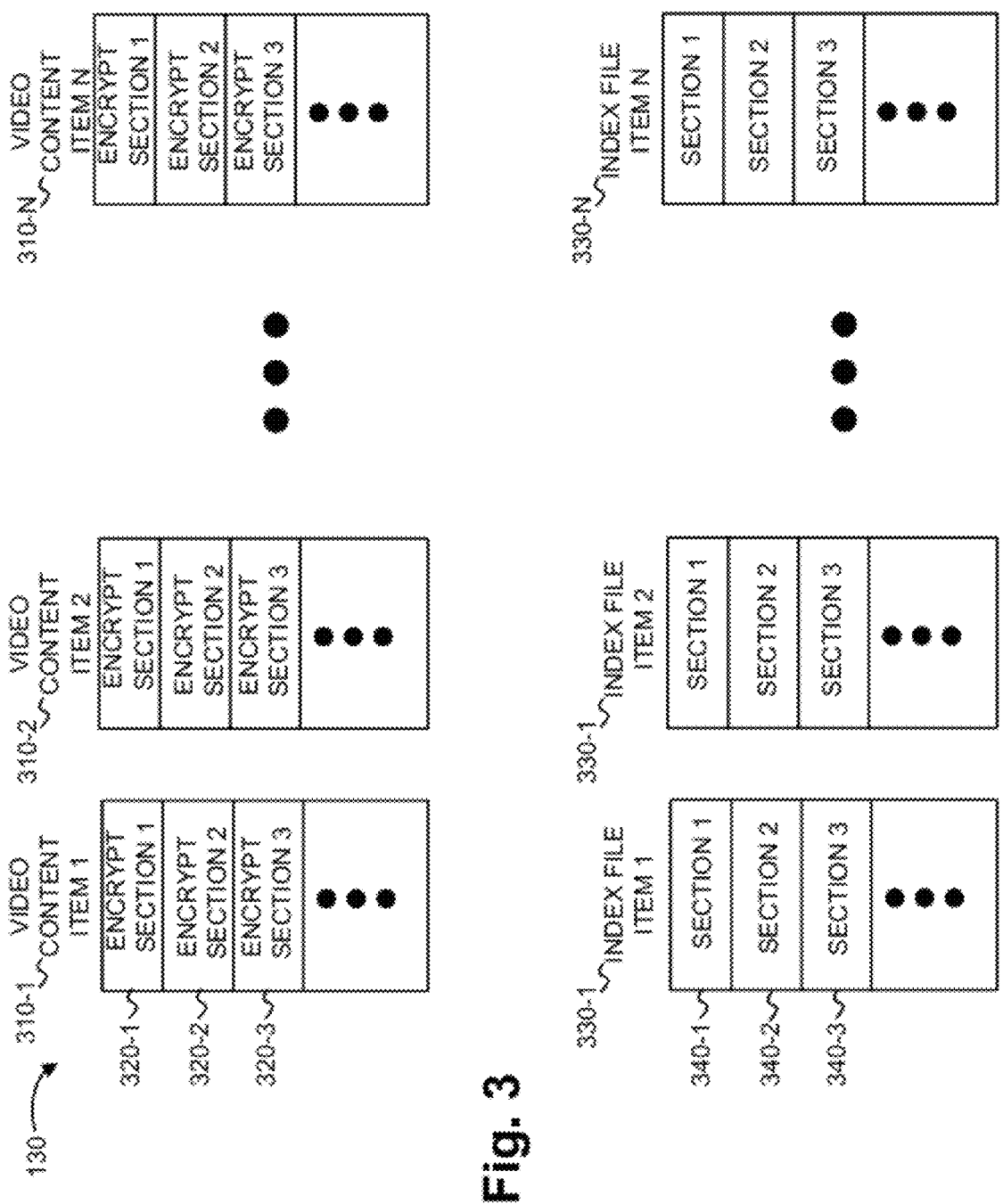
FIG. 3 is a diagram illustrating an example of components implemented by the content servers shown in FIG. 1.

FIG. 3 is a diagram illustrating an example of components implemented by content servers 130. As previously mentioned, content servers 130 may store content, such as television programming (live or delayed broadcasts), video on demand programming, and/or other types of content. The content may be received as streams of data from content aggregator 140. The streams may each be encrypted by content aggregator 140, such as by using 128 bit AES encryption (or another encryption algorithm).

As shown in FIG. 3, content received and stored by content servers 130 is illustrated as video content items 310-1 (video content item 1) through video content item 310-N (video content item N). Each video content item 310 may correspond to, for example, a television program, a television broadcast stream, a video on demand movie, or another content item that may be delivered to a user. Each video content item 310 may be divided into sections, in which each section may be encrypted using a different encryption key. Video content item 310-1, for example, is shown as including multiple sections, section 320-1 (encrypt section 1), 320-2 (encrypt section 2), 320-3 (encrypt section 3), etc. The length of each section 320 may be, for example, based on a certain time duration (e.g., 30 minute sections), a target section size, or based on other factors.

Content servers 130 may also store an index file relating to each of the video content items 310. The index files are shown in FIG. 3 as index files 330-1 through 330-N. Each index file 330 may include information corresponding to each of the encrypted sections 320 of video content items 310. Index file 330-1, for example, is illustrated as including multiple sections, where sections 340-1, 340-2, and 340-3 correspond to content sections 320-1, 320-2, and 320-3, respectively. Each section 340 may include, for example, information such as the beginning and end of the section, a link or other resource indicating the location of the decryption key file for the section, and/or descriptive information relating to the section. In one implementation, each of index sections 340 may include a uniform resource locator (URL) that points to a resource on entitlement/key server 150 at which the decryption key file for the corresponding content section 320 can be obtained.

By dividing a content item 310 into sections, the decryption key for the content item may be rotated. Each key rotation (i.e., each new section 320), may require the viewing device to re-request the appropriate key file. Accordingly, a viewing device that becomes ineligible to receive the content may be denied access to the content.

Although FIG. 3 shows example components of content servers 130, in other implementations, content servers 130 may contain fewer components, different components, differently arranged components, or additional components than depicted in FIG. 3.

As previously mentioned, techniques described herein may be used to playback video content delivered from content servers 130 to portable computing devices. The video content may be content designed to play on portable communication devices such as smart phones, tablet or "pad" computers, or laptops. In one implementation, to playback the video content, a user may first download and install a video playback application ("app") on the computing device. The playback application may then communicate with content servers 130, entitlement/key servers 150, and/or authentication server 180 to download and playback the desired video content. In one implementation, the video content may be delivered over content delivery network 110 using a packet streaming protocol, such as the known HTTP Live streaming protocol. In situations in which customer premise 120 connects to a telecommunications provider so that the subscriber can receive both traditional television signals, via a dedicated connection, and IP based data services, such as an Internet connection, the video content delivered to the playback application may be delivered via the IP-based packet network (also referred to as over-the-top OTT delivery herein).

Figure 4:
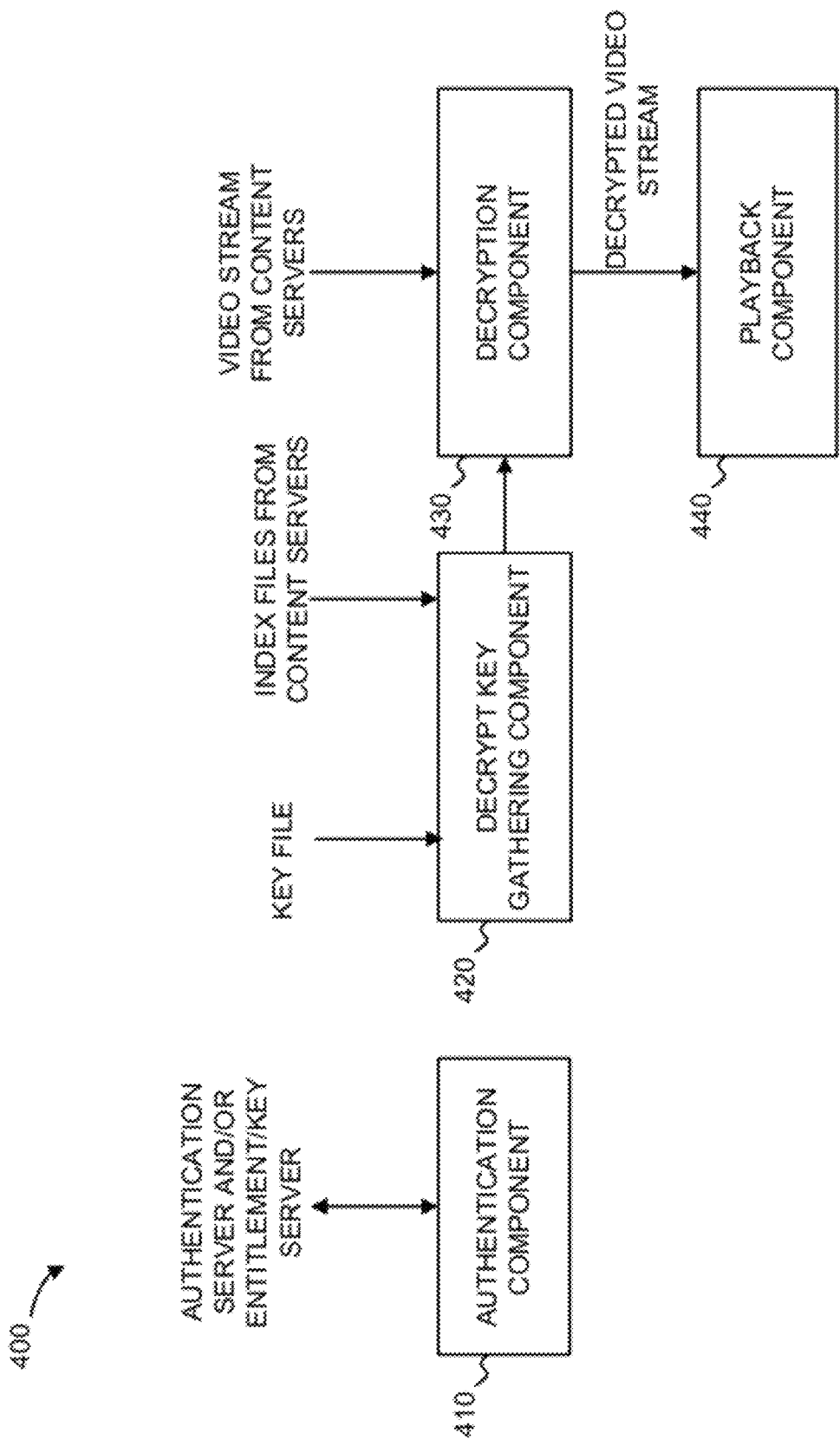
FIG. 4 is a diagram illustrating an example of functional components of a playback application.

FIG. 4 is a diagram illustrating an example of functional components of a playback application 400, such as an application running on a portable computing/communication device (e.g., laptop computer 124, portable communication device 126, or computing devices 170). The playback application may be particularly designed to playback live television program, such as a sporting presentation, on a device other than a user's television set. In this manner, a user can enjoy traditional television programming on a more portable device.

As shown in FIG. 4, playback application 400 may include an authentication component 410, a decrypt key gathering component 420, a decryption component 430, and a playback component 440.

Authentication component 410 may communicate with authentication server 180 and/or entitlement/key server 150 to authenticate the user of playback application 400 and to obtain permission to view a selected program. Decrypt key gathering component 420 may generally receive the index file 330 corresponding to the selected program and may obtain one or more decryption key files for the selected program. Index file 330 may be obtained from content servers 130 and the decryption keys may be obtained from entitlement/key server 150. Using the obtained decryption key, decryption component 430 may decrypt an incoming video stream corresponding to the selected program. Playback component 440 may playback the decrypted video stream to the user, such as on an LCD display of the portable computing/communication device. The operation of the components of playback application 400, and its interaction with other elements of environment 100, will be described in more detail below with reference to FIGS. 5-7.

Although FIG. 4 shows example components of playback application 400, in other implementations, playback application 400 may contain fewer components, different components, differently arranged components, or additional components than depicted in FIG. 4. Alternatively, or additionally, one or more components of playback application 400 may perform one or more tasks described as being performed by one or more other components of playback application 400.

Figure 5:
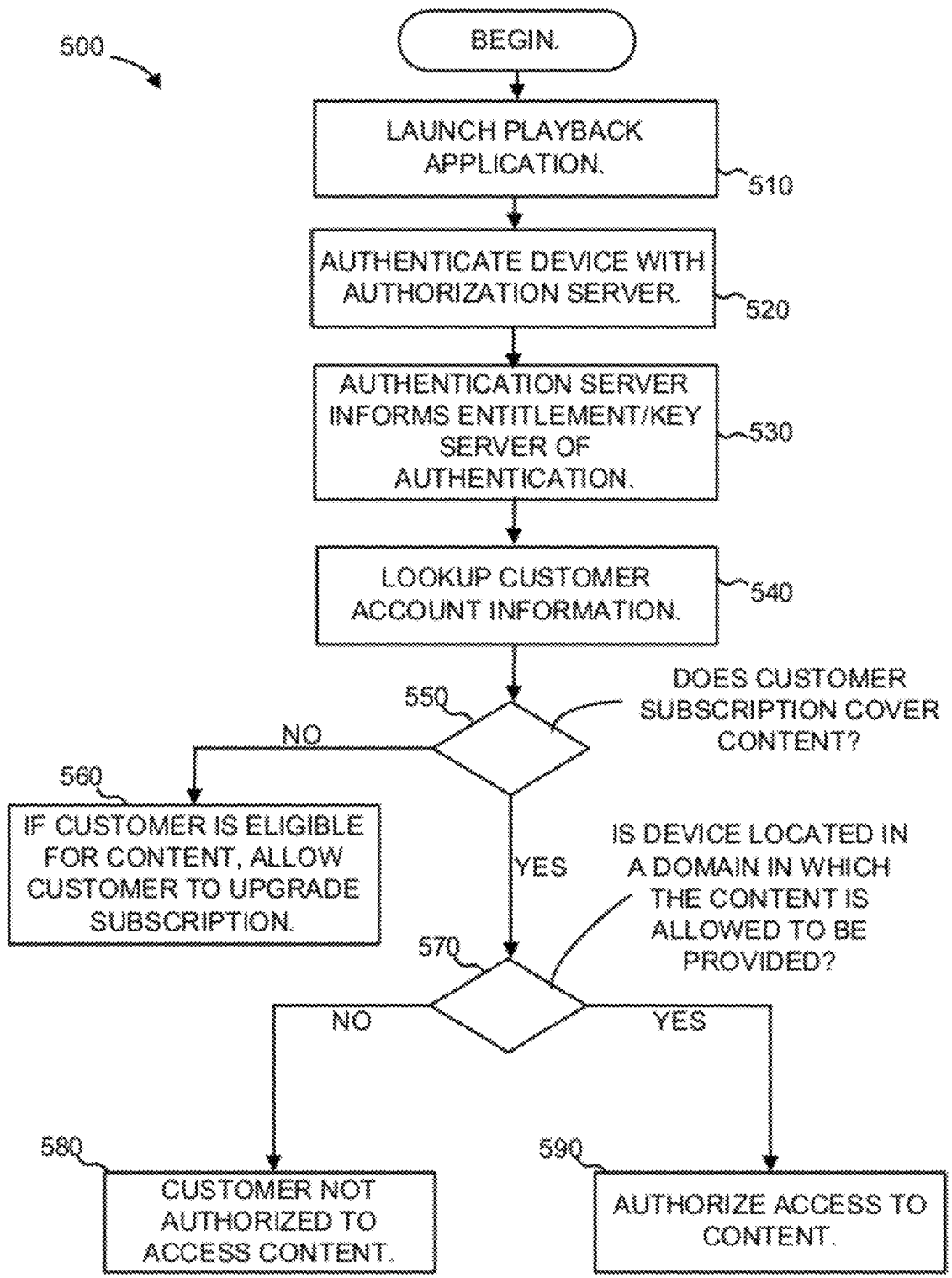
FIG. 5 is a flow chart illustrating an example process for authenticating a playback application to playback requested video content.

FIG. 5 is a flow chart illustrating an example process 500 for authenticating playback application 400 to playback requested video content. In one implementation, playback application 400 may be an application dedicated to the viewing of a particular television channel or content stream. For instance, playback application 400 may be an application dedicated to a sports channel. In this situation, when the user starts playback application 400, playback application 400 may begin the process of presenting this channel to the user. In other possible implementations, playback application 400 may be a more general application in which the user selects the desired content that the user wishes to view.

Process 500 may include launching playback application 400 (block 510). As previously mentioned, playback application 400 may be launched from portable communication device 126 (e.g., a smart phone, tablet computer, "pad" computer) or from another computing device. Portable communication device 126 may include connectivity to an external network, such as an IP packet based network, through a local access point, such as wireless router 122.

Process 500 may further include authenticating portable communication device 126 with authentication server 180 (block 520). For example, authentication component 410 of playback application 400 may send an authorization request via a hypertext transfer protocol secure (HTTPS) connection to authentication server 180. The authorization request may include the IP address of the access point (e.g., wireless router 122) through which playback application 400 is connecting. In some implementations, the authorization request may also include the media access control (MAC) address of the access point. The authorization request may be signed with a certificate issued by authorization server 180, which may be used to ensure that another party cannot rewrite, replay, or forge requests from playback application 400.

Authentication server 180 may extract the IP address and/or the MAC address associated with the authentication request. Authentication server 180 may inform entitlement/key server 150 of the authentication (block 530). For example, authentication server 180 may generate an encrypted signature header that contains the IP address and/or the MAC address of the access point, and forward the encrypted signature header to entitlement/key server 150.

Process 500 may further include looking up account information of the customer corresponding to the authentication (block 540). In one implementation, the account to look up (i.e., the account corresponding to the authentication request) may be determined based on the IP address or MAC address of the access point. Alternatively, the user may enter an account name or login identifier, that may be transmitted with the authorization request and may be used to lookup the account information. Entitlement/key server 150 may request the account information from user account server 160. The account information that is requested may include information relating to the channels or services to which the user has subscribed. Additionally, the account information may include the IP address and/or the MAC address associated with the access point of the user. The IP address associated with wireless router 122 may be an IP address that is assigned to the user by, for example, the telecommunications company that publishes playback application 400 as part of the Internet provisioning process of customer premise 120. Accordingly, the telecommunication company may know the user's "home" IP address. Similarly, the access point being used by the user may be an access point provided to the user as part of the user's agreement with the telecommunications company. The MAC address of the user's "home" access point may thus be known and stored as part of the user account information.

Based on the looked-up account information, entitlement/key server 150 may determine whether the user is subscribed to the content being requested (block 550). For example, in the situation in which playback application 400 is an application that provides a single television channel to the user's portable communication device, entitlement/key server 150 may determine whether the user's television service is currently subscribed to this channel. If not, (block 550-NO), and if the user is eligible to subscribe to the requested content (e.g., the user is in an area that is eligible to receive the content), entitlement/key server 150 may instruct playback application 400 to provide the user instructions for upgrading the user's account to one that supports the request (block 560).

When the user's subscription covers the requested content, (block 550-YES), entitlement/key server 150 may determine whether the portable communication device is located in a domain that is allowed to receive the content (block 570). In some situations, the content owner may place geographic limitations on where the content can be displayed. For example, a content owner may stipulate that a user that is subscribed to a television channel may only be allowed to view the television channel in or near the corresponding customer premise. Thus, the content owner may permit the subscriber to view the television channel on portable communication devices, but only when the subscriber is within the domain of the customer premise.

In one implementation, entitlement/key server 150 may determine whether the portable communication device is located in an allowed domain based on the IP address and/or MAC address that is associated with the access point through which the subscriber connects. Entitlement/key server 150 may compare the MAC address (or IP address) received from authentication server 180 to the MAC address associated with the subscriber's account (as previously received from user account server 160). When the addresses match, playback application 400 may be assumed to be in an allowed domain. If the addresses do not match, playback application 400 may be assumed to not be in an allowed domain.

When playback application 400 is determined to be in an allowed domain, entitlement/key server 150 may authorize access to the requested content (block 590). Otherwise, entitlement/key server 150 may not authorize access to the requested content (block 580). Authorizing access may include, either by entitlement/key server 150 or authorization server 180, transmitting an encrypted session cookie to playback application 400.

In some implementations, additional factors may be considered when determining whether to authorize access to content. For example, a limit to the maximum number of concurrent connections per customer premise 120 may be enforced (e.g., two per customer premise).

Figure 6:
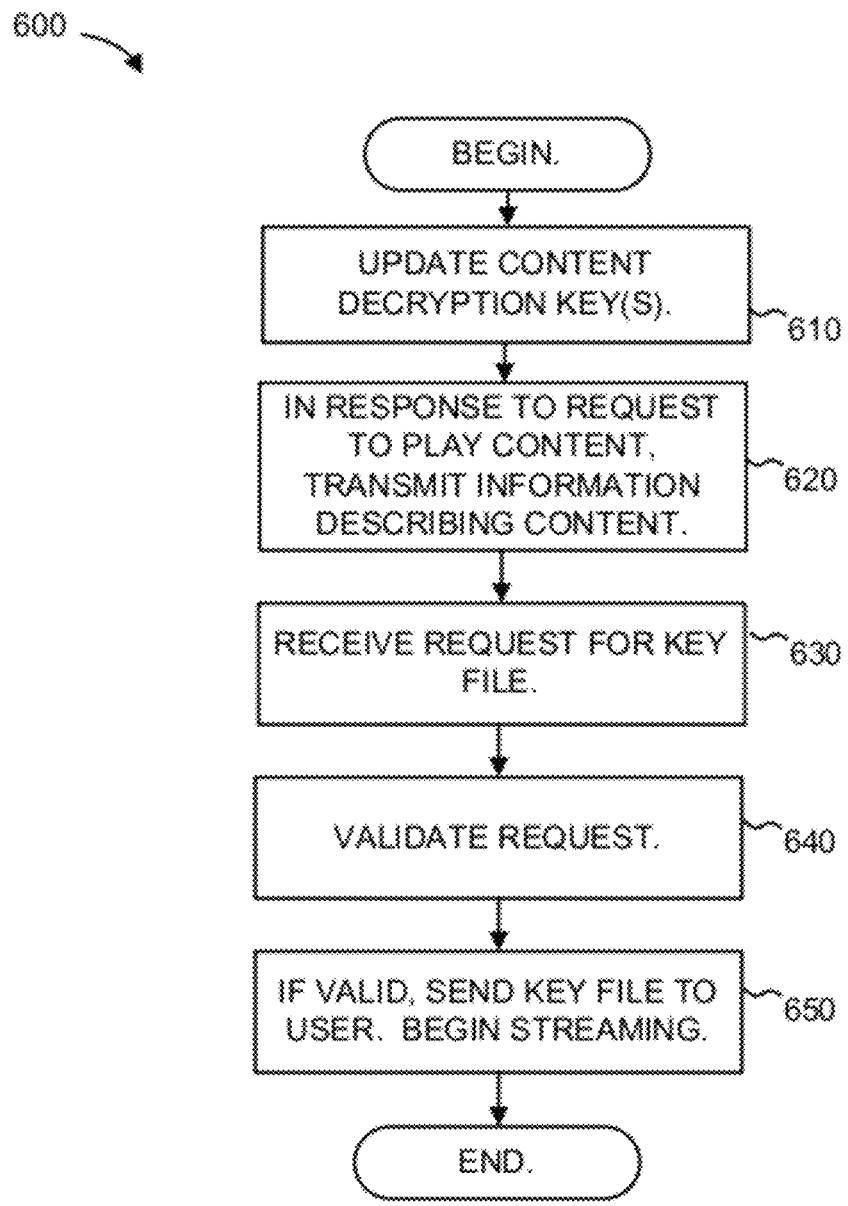
FIG. 6 is a flow chart illustrating an example process for streaming content to a playback application.

FIG. 6 is a flow chart illustrating an example process 600 for streaming content to playback application 400. Process 600 may be performed by, for example, one or more of content servers 130, content aggregator 140, entitlement/key server 150, or authentication server 180.

Process 600 may include updating the content decryption keys (block 610). As previously mentioned, content aggregator 140 may encrypt received content streams and provide the encrypted streams to content servers 130. The key used to encrypt the content streams may periodically (e.g., every 30 minutes) be changed. The decryption keys may be published to entitlement/key server 150 and content servers 130 may store index files 330 that provide links to key files that include the decryption keys.

A user of a portable communication device may, through playback application 400, request the playing of content, such as a request that a particular television channel be streamed to the portable communication device. In response to the request, content servers 130 may transmit information describing the content (block 620), such as one of index files 330. Index file 330 may act as a "playlist" that describes how to obtain the content. In one implementation, index file 330 may include a link to the decryption key file corresponding to the desired content.

Playback application 400 may receive an index file 330, and based on the index file, may request the appropriate key file from entitlement/key server 150. For example, decrypt key gathering component 420 may request the key file, over the HTTPS session, based on the link in index file 330. The request may embed an encrypted session cookie (or other identifier) that may indicate that the request is part of a valid session (as was previously established using the process described in FIG. 5).

Referring back to FIG. 6, entitlement/key server 150 may receive the request for the key file (block 630), and, in response, may validate the request (block 640). Validating the request may include validating the encrypted session cookie received with the request. When the request for the key file is valid, entitlement/key server 150 may transmit the key file, which contains the needed decryption key (block 650). Additionally, content server 130 may begin streaming the appropriate section 320 of the requested content item 310 (block 650).

Figure 7:
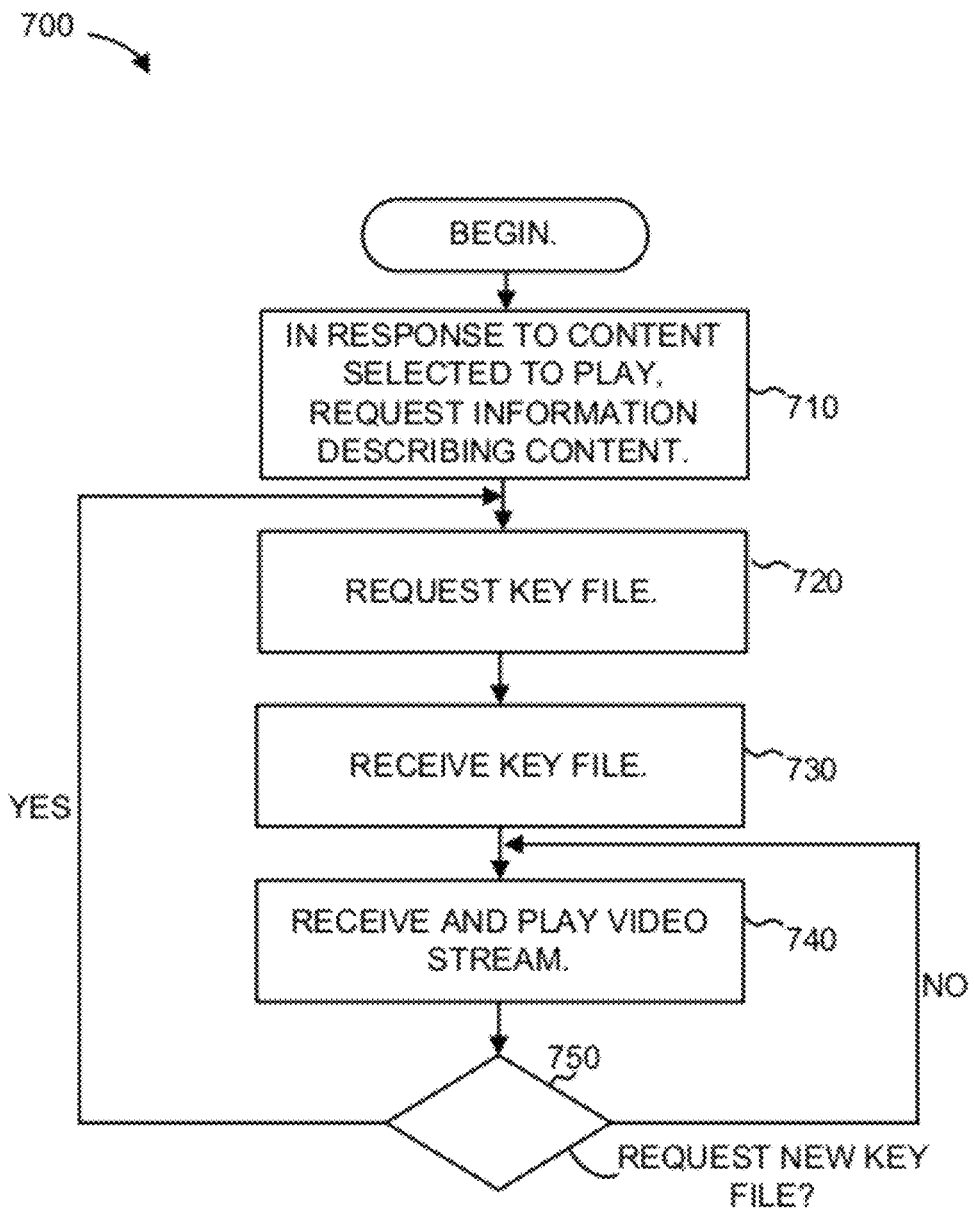
FIG. 7 is a flow chart illustrating an example process for receiving streaming content at a portable communication device.

FIG. 7 is a flow chart illustrating an example process 700 for receiving streaming content at a portable communication device. Process 700 may be performed, for example, by playback application 400, executing on a portable communication device.

Process 700 may include, in response to the user selecting content to play, requesting information describing the content (block 710). Playback application 400 may, for example, request the index file 330 (i.e., a "playlist") corresponding to the content from content server 130. The index file 330 may include a link or other reference describing the resource to use to retrieve the decryption key for the content.

Process 700 may further include requesting the key file (block 720). For example, decrypt key gathering component 420 may use a link in index file 330 to request the key file, via an HTTPS request, from entitlement/key server 150. Decrypt key gathering component 420 may return the encrypted session cookie that was previously received during authentication of the portable communication device (e.g., as performed in process 500).

Process 700 may further include receiving the key file in response to the request made in block 720 (block 730). The key file may be received, for example, by decrypt key gathering component 420. The key file may include the decryption key needed to decrypt the requested content. In some implementations, the key file may include other information, such as an indication of when the decryption key expires (i.e., when a new key file should be requested).

Process 700 may further include receiving and playing the video stream from content servers 130 (block 740). Decryption component 430 of playback application 400 may receive the encrypted video stream from content servers 130. Decryption component 430 may use the key received in block 730 to decrypt the video stream. The video stream may then be played back to the user.

As mentioned previously, the key for a video stream may be changed at various times. Process 700 may further include determining if a new key file should be requested (block 750). The new key file may be requested periodically, based on a certain amount of received video content, or based on other factors. For example, each key file may include an indication of when the key in the key files expires. When it is time to request a new key file (block 750-YES), process 700 return to block 720. Otherwise, the current key may continue to be used to playback the video stream (block 750-NO).

FIG. 8 is signal flow diagram illustrating an example of communications between components in environment 100 during streaming of video content. In FIG. 8, assume that a live television channel is streamed to playback application 400, which is executing on portable communication device 126. Additionally, assume that the content owner (e.g., the broadcaster of the television program) has specified that users wishing to view the television channel on a device other than a traditional television can only view the channel when the user is subscribed to the channel and when portable communication device 126 is located within the customer premise.

At some point, such as whenever playback application 400 is initially started, and whenever portable communication device 126 changes network connections, playback application 400 may contact authentication server 180 to authenticate the current session (communication 805). As mentioned above, the session may be authenticated when the IP address and/or MAC address associated with the user's access point is an approved address (i.e., the address corresponds to the access point installed in customer premise 120 of the user) and when the user is subscribed to the television channel. In this situation, an encrypted session authorization cookie may be passed back to playback application 400 (communication 810). The session authorization cookie may only be valid for the current communication session with authentication server 180. Accordingly, if the user changes access points, such as by moving to a different location, playback application 400 may re-perform the authentication to obtain a new session authorization cookie.

Content aggregator 140, as it aggregates and encrypts incoming content, may upload decryption key files to entitlement/key server 150 (communication 815). A new key file may be uploaded, for example, every 30 minutes for a television channel.

At some point, the user of playback application 400 may request an index file, relating to a particular content items, from content servers 130 (communication 820). Content servers 130 may return the index file to playback application 400 (communication 825).

The index file may contain a link to the key file for the content item. Playback application 400 may thus use the index file to request the key file from entitlement/key server 150 (communication 830). Entitlement/key server 150 may validate the user's session, such as by validating an encrypted session cookie that is passed to entitlement/key server 150 as part of the key file request. If the validation is successful, the key file may then be returned to playback application 400 (communication 835).

Playback application 400 may request the desired video content from content servers 130 (communication 840). The video content may then be streamed to playback application 400 over content delivery network 110 (communication 845). The streamed video content may be, for example, streamed "over the top" through an IP packet-based network.

As described above, video content may be streamed to a portable communication device. A user's entitlement to view the video content may be made based on a number of possible factors, such as the physical location of the portable communication device. Advantageously, content owners/providers may have a relatively high level of flexibility in offering content.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 5-7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more computing devices, the method comprising:
   receiving, by the one or more computing devices via a network, a request to authenticate a portable device to receive streaming video content via a network connection to a first access point, the request including an Internet protocol (IP) address of the first access point;
   determining, by the one or more computing devices, whether the portable device is in a geographic location, corresponding to a customer premises of an account associated with the portable device, which is within geographic limitations set by a content provider with respect to streaming video content, the determining including determining whether the IP address is an IP address that is active and provisioned for the customer premises of the account;
   determining, by the one or more computing devices, whether a maximum number of concurrent network connections at the customer premises has been reached;
   establishing, by the one or more computing devices, responsive to determining that the maximum number of concurrent network connections has not been reached, a first communication session via the network connection to the first access point;
   streaming, by the one or more computing devices and via the first communication session, the video content to the portable device when the portable device is determined to be in the geographic location corresponding to the customer premises and when the maximum number of connections has not been reached;
   determining, by the one or more computing devices, that the portable device has changed the network connection from the first access point to a second access point at the customer premise;
   terminating, by the one or more computing devices, the first communication session and establishing a second communication session via the network connection to the second access point; and
   streaming, by the one or more computing devices, the video content to the portable device via the second communication session.

2. The method of claim 1, further comprising:
   determining whether the account associated with the portable device is subscribed to the video content, and wherein the streaming of the video content is performed only when the account associated with the portable device is subscribed to the video content.

3. The method of claim 1, wherein the streaming comprises an encrypted version of the video content to the portable device; and the method further comprising:
   storing a key file that includes a decryption key to decrypt the encrypted version of the video content.

4. The method of claim 3, further comprising:
   receiving a request, from the portable device, for the key file; and
   transmitting, in response to the request for the key file, the key file to the portable device.

5. The method of claim 1, wherein the streaming comprises streaming an encrypted version of the video content to the portable device, wherein the encrypted version of the video content is encrypted using a different encryption key for each of a plurality of sections of the encrypted version of the video content; and the method further comprises:
   receiving a plurality of requests, from the portable device, for a decryption key, corresponding to respective sections of the encrypted version of the requested video content.

6. The method claim 1, where the portable device includes a tablet computer, a smart phone, or a laptop computer.

7. The method of claim 1, where the video content includes streaming video corresponding to a television channel.

8. A non-transitory computer-readable medium containing programming instructions for execution by one or more processors, the computer-readable medium comprising:
   instructions to receive, via a network, a request to authenticate a portable device to receive streaming video content via a network connection to a first access point, the request including an Internet protocol (IP) address of the first access point;
   instructions to:
      determine whether the portable device is in a geographic location, corresponding to a customer premises of an account associated with the portable device, which is within geographic limitations set by a content provider with respect to locations to which the streaming video is to be streamed, the determining including determining whether the IP address is an IP address that is provisioned for the customer premises of the account;
      determine whether a maximum number of concurrent network connections at the customer premises has been reached; and
      establish, responsive to the determination that the IP address is an IP address that is provisioned for the customer premises of the account and that the maximum number of concurrent network connections has not been reached, a communication session via the network connection to the first access point; and
   instructions to stream the video content to the portable device via the communication session;
   instructions to determine that the portable device has changed the network connection from the first access point to a second access point at the customer premise;
   instructions to terminate the first communication session and establish a second communication session via the network connection to the second access point; and
   instructions to stream the video content to the portable device via the second communication session.

9. The non-transitory computer-readable medium of claim 8, further comprising:

instructions to determine whether the account associated with the portable device is subscribed to the video content, and wherein the instructions to stream the video content include instructions to stream the video content only when the account associated with the portable device is subscribed to the video content.

10. The computer-readable medium of claim 8, wherein the instructions to stream the video content include instructions to stream an encrypted version of the video content to the portable device; and the non-transitory computer-readable medium further comprises:

instructions to store a key file that includes a decryption key to decrypt the encrypted version of the video content.

11. The non-transitory computer-readable medium of claim 10, further comprising:

instructions to receive a request, from the portable device, for the key file; and instructions to transmit, in response to the request for the key file, the key file to the portable device.

12. The non-transitory computer-readable medium of claim 8, wherein the instructions to stream the video content include instructions to stream an encrypted version of the video content to the portable device, wherein the encrypted version of the video content is encrypted using a different encryption key for each of a plurality of sections of the encrypted version of the video content; and instructions to receive a plurality of requests, from the portable device, for a decryption key, corresponding to respective sections of the encrypted version of the requested video content.

13. A system, comprising:

a content server to store encrypted video content that is to be transmitted, via a network connection to an access point at a customer premises, to a portable device associated with a subscriber to television content;

an entitlement server to store keys needed to decrypt the encrypted video content, the entitlement server authenticating, in response to an authentication request that includes an Internet protocol (IP) address associated with the portable device, the portable device responsive to a determination that:

a maximum number of concurrent network connections at the customer premises has not been reached, an authorized communication session is established via the network connection to the access point, the authorized communication session including a communication session that has changed the access point, from a previous access point, associated with the communication session, and the portable device is in a geographic location, corresponding to the customer premises of an account associated with the portable device, which is within geographic limitations set by a content provider with respect to providing encrypted video content, the determination that the portable device is in a geographic location, corresponding to the customer premises of the account associated with the portable device, including determining that the IP address is an IP address that is provisioned for the customer premises associated with the account;

wherein the entitlement server is further to:

receive requests, from the portable device, for the keys needed to decrypt the encrypted video content, and return, in response to the requests for the keys, the keys to the portable device when the portable device is authenticated; and a content aggregator to receive broadcast television content and provide the television content, as the encrypted video content, to the content server.

14. The system of claim 13, wherein the entitlement server additionally authenticates the portable device only when the account associated with the portable device is subscribed to the television channel.

15. The system of claim 13, further comprising:

an authentication server to receive an authentication request from the portable device and, in response to the authentication request, provide session authorization information to the portable device, wherein the entitlement server determines whether establish the authenticated communication session based on the session authorization information.

16. The system of claim 13, where a key used to encrypt the video stream content is periodically altered.

* * * * *